United States Patent
May et al.

(10) Patent No.: US 7,613,909 B2
(45) Date of Patent: Nov. 3, 2009

(54) RESUMING THREAD TO SERVICE READY PORT TRANSFERRING DATA EXTERNALLY AT DIFFERENT CLOCK RATE THAN INTERNAL CIRCUITRY OF A PROCESSOR

(75) Inventors: Michael David May, Bristol (GB); Peter Hedinger, Bristol (GB); Alastair Dixon, Bristol (GB)

(73) Assignee: XMOS Limited, London (GB)

( * ) Notice: Subject to any disclaimer, the term of this patent is extended or adjusted under 35 U.S.C. 154(b) by 204 days.

(21) Appl. No.: 11/785,345

(22) Filed: Apr. 17, 2007

(65) Prior Publication Data

US 2008/0263330 A1    Oct. 23, 2008

(51) Int. Cl.
*G06F 13/14* (2006.01)
(52) U.S. Cl. .................. 712/225; 710/15; 712/38
(58) Field of Classification Search .................. None
See application file for complete search history.

(56) References Cited

U.S. PATENT DOCUMENTS

| 5,592,488 A | * | 1/1997 | Thomann et al. | 370/465 |
| 6,947,425 B1 | * | 9/2005 | Hooper et al. | 370/394 |
| 7,457,246 B2 | * | 11/2008 | Zhang | 370/230 |

2006/0259669 A1    11/2006    Dockser et al.

FOREIGN PATENT DOCUMENTS

WO    2006058242 A2    6/2006

OTHER PUBLICATIONS

International Search Report and Written Opinion of the International Searching Authority dated Sep. 1, 2008.

* cited by examiner

*Primary Examiner*—Kenneth S Kim
(74) *Attorney, Agent, or Firm*—Sughrue Mion, PLLC

(57) ABSTRACT

A processor has an interface portion and an internal environment. The interface portion comprises at least one port. The internal environment comprises an execution unit arranged to execute instructions in dependence on a first timing signal and to transfer data between the interior portion and the at least one port in dependence on the first timing signal; and a thread scheduler for scheduling a plurality of threads for execution by the execution unit, each thread comprising a sequence of instructions and the thread scheduler being arranged to schedule the threads in dependence on the first timing signal. The port is arranged to transfer data between the port and an external environment in dependence on a second timing signal, and to alter a ready signal in dependence on the second timing signal to indicate a transfer of data with the external environment. The thread scheduler is configured to schedule one or more associated threads for execution in dependence on the ready signal.

62 Claims, 7 Drawing Sheets

RESUMING THREAD TO SERVICE READY PORT TRANSFERRING DATA EXTERNALLY AT DIFFERENT CLOCK RATE THAN INTERNAL CIRCUITRY OF A PROCESSOR

FIELD OF THE INVENTION

The present invention relates to a processor having at least one clocked port, and particularly to an interface processor for interfacing with other processors or external devices.

BACKGROUND

One of the challenges facing processor designers is the handling of an ever-increasing number of external devices which wish to communicate with the processor. Generally this is done by providing some kind of interrupt handling capability for the processor for handling activity arising at ports connected to external devices. Increasingly, more sophisticated interface logic is used at these ports to deal with, for example, multiple external devices per port.

Interfacing is needed in a wide variety of different contexts. One context which is discussed herein by way of a background example is in mobile applications processing.

FIG. 1 shows an exemplary application of a mobile applications processor 2. The applications processor 2 comprises a CPU 4 and a plurality of interface controllers 6 which interface with a plurality of peripheral devices 8. The interface controllers include: a memory controller 6a for interfacing with a hard-drive (HDD) 8a and a SDRAM memory 8b; a video controller 6b for interfacing with a camera 8c; a display controller 6c for interfacing with an LCD display 8d; an audio controller 6d for interfacing with a microphone 8e, speaker 8f and headset 8g; and a connectivity controller 6e for interfacing with a keyboard 8h, a Universal Serial Bus (USB) device 8i, a Secure Digital (SD) card 8j, a Multi-Media Card (MMC) 8k, and a Universal Asynchronous Receiver/Transmitter (UART) device 8l. The interface controllers 6 are typically connected to the CPU 4 via a bus 3. The system also comprises a power controller 10 and radio processor 12.

Note that the interface controllers 6 are shown somewhat schematically, but represent generally some kind of dedicated I/O logic or specially configured ports.

Conventionally, external interfacing is achieved either using interrupts or by ing. When interrupts are used, an external peripheral device sends a signal to inform the processor either that it has data ready to input to the processor or that it requires data from the processor. When ing is used, the processor continually checks the state of the device to determine whether or not it is ready to supply or accept data.

One possibility for implementing an applications processor 2 such as that of FIG. 1 is to use an Application Specific Integrated Circuit microcontroller (ASIC). ASICs are hard-wired devices possibly including microprocessors dedicated to a particular application and optimised to suit that application. For a given function, they are generally cheaper and consume less power than other options. However, they are complex to design, must be pre-designed and cannot readily be reconfigured.

Another possibility is to use Field Programmable Gate Array (FPGA) devices. FPGAs are semiconductor devices that can be configured "in the field" after manufacture. To configure an FPGA, first a computer is used to model the desired logical functions, for example by drawing a schematic diagram or creating a text file describing the functions. The FPGA comprises an array of look-up tables which communicate via statically configured interconnects. The computer model is compiled using software provided by the FPGA vendor, which creates a binary file that can be downloaded into the FPGA look-up tables. This allows manufacturers of equipment to tailor the FPGA to meet their own individual needs.

In this example, the interface controllers 6 are implemented as FPGAs. This has the benefit that the manufacturer of the mobile telephone can purchase generic FPGA devices 2 and then configure them on site (i.e. "in the field") to be specific to their desired application. The disadvantage of FPGAs however is that they are more expensive, slower and consume more power than ASICs.

In alternative examples, the whole chip 2 could be implemented in FPGA, or the chip 2 could be a general purpose processor with separate FPGA chips connected between the chip 2 and the respective peripherals 8. However, these options would be even more expensive and power-consuming—prohibitively so for most mobile phones and other consumer devices.

It would be advantageous to achieve the configurability of an FPGA but with the price, speed, scope and energy consumption levels of an ASIC. One particular challenge involved in achieving this aim is to provide suitable timing for the interactions between a processor and its environment.

SUMMARY

According to one aspect of the present invention, there is provided a processor having an interface portion and an internal environment, the interface portion comprising at least one port and the internal environment comprising: an execution unit arranged to execute instructions in dependence on a first timing signal and to transfer data between the interior portion and the at least one port in dependence on the first timing signal; and a thread scheduler for scheduling a plurality of threads for execution by the execution unit, each thread comprising a sequence of instructions and the thread scheduler being arranged to schedule the threads in dependence on the first timing signal; wherein the at least one port is arranged to transfer data between the port and an external environment in dependence on a second timing signal, and to alter a ready signal in dependence on said second timing signal to indicate a transfer of data with the external environment, the thread scheduler being configured to schedule one or more associated threads for execution in dependence on the ready signal.

The present invention times the scheduling of multiple threads independently of the timing signal used to transfer data to and from the ports, thus separating the timing of the thread scheduling from the timing of the interface. This improves the reaction time of the processor to external stimuli, and improves the flexibility of the processor in determining which threads and their associated ports to service.

For example, in embodiments, the interface portion may comprise a plurality of ports arranged to simultaneously transfer data between each port and an external environment in dependence on the second timing signal; each port may adapted to alter a respective ready signal in dependence on said second timing signal to indicate the transfer with the external environment, said scheduling by the thread scheduler being in dependence on the ready signals; and the execution unit may be arranged to transfer data between the interior portion and each of the ports at different times in dependence on the first timing signal. Thus from an external viewpoint, the ports timed by the same (second) timing signal appear to act as a single port, but from an internal viewpoint they act as several ports which can be serviced in any order at any time.

In embodiments, the thread scheduler may be configured to maintain a set of runnable threads, and said scheduling by the thread scheduler may comprise scheduling threads from said set in dependence on the first timing signal and suspending a thread by removing it from said set. This suspended-thread approach is preferable to the use of interrupts when fast reaction time is required. Using suspended threads, the thread scheduler can prepare to execute a thread in expectance of the associated activity, which means the processor is "primed" ready to react. In contrast, using interrupts, the execution unit is interrupted by a signal from an external device whilst executing some potentially unrelated code. In the interrupt case, the current program state must be saved before the interrupt can be acted upon. The reaction time using interrupts is therefore much slower. ing is less energy efficient because of the continual queries and responses required.

The transfer may comprise an input operation whereby data is captured into said at least one port from the external environment, and said alteration may comprise setting said ready signal or signals into a first state which indicates the availability of that data for input to the internal environment. The transfer may comprise an output operation whereby data is presented from each of said at least one ports to the external environment, and said alteration may comprise setting said ready signal or signals into a second state which indicates the availability of the at least one port for further transfer of data with the internal environment.

The execution unit may be adapted to execute an input instruction which inputs data from a port to the internal environment provided that a respective one of said ready signal or signals is in the first state, the input instruction being a constituent instruction of the sequence of said one or more associated threads. The execution unit may be adapted to execute an output instruction which outputs data from the internal environment to a port provided that a respective one of said ready signal or signals is in the second state, the output instruction being a constituent instruction of the sequence of said one or more associated threads.

The thread scheduler may be adapted to set said respective ready signal into the second state upon completion of the input instruction. The thread scheduler may be adapted to set said respective ready signal into the first state upon completion of the output instruction.

Said scheduling by the thread scheduler may comprise suspending execution of the input instruction's thread until the respective ready signal is set to said first state. Said scheduling by the thread scheduler may comprise suspending execution of the output instruction's thread until the respective ready signal is set to said second state.

The transfer may comprise both an input operation and an output operation, and the execution unit may be arranged to execute an input instruction and an output instruction.

The second timing signal may comprise a sequence of alternating primary and secondary edges, and the second timing signal may be arranged to trigger the input operation on a primary edge and the output operation on a secondary edge. Said setting of the ready signal or signals into the first state may be performed on said primary edge, and said setting of the ready signal or signals into the second state may be performed on said secondary edge. The execution unit may be configured to execute a rising mode instruction which sets one of said at least one ports to a rising mode in which said primary edge is a rising edge and said secondary edge is a falling edge, and a falling mode instruction which sets one of said at least one ports to a falling mode in which said primary edge is a falling edge and said secondary edge is a rising edge.

Said external environment may comprise at least one pin of an integrated circuit in which said processor is housed. Said external environment may comprise another processor on an integrated circuit in which said processor is housed.

The transfer of data between a port and the internal environment may comprise a transfer between that port and the execution unit. The internal environment may comprise a bus and the transfer of data between a port and the interior portion may comprise a transfer between that port and the bus. The interior portion may comprise a plurality of sets of registers, each set storing information relating to a respective one of said plurality of threads, and the transfer between a port and the internal environment may comprise a transfer between that port and one of said registers.

At least one of the first and second timing signals may be a clock signal. At least one of the first and second timing signals may be an irregular timing signal.

The interface portion may comprise a timing signal generator operable to derive the second timing signal from an external timing signal. The interface portion may comprise a timing signal generator operable to produce the second timing signal by dividing the frequency of the first timing signal by a factor. The execution unit may be configured to execute a set factor instruction to allocate said factor. The interface portion may comprise a register associated with the at least one port for storing an identifier of a timing signal generator, and a switch box operable to supply the second timing signal from the identified timing signal generator to the port; and the execution unit may be configured to execute a set generator instruction to store the identifier.

The at least one port may have a data mode in which it transfers data and a clock output mode in which it outputs the second clock signal.

The interface portion may comprise a plurality of ports and the internal environment may comprise at least one register, the register being arranged to store data input from a first one of said ports; and the execution unit may be arranged to execute a shift instruction to shift the data in the register by the width of the first port, and to subsequently execute an input instruction to input data from a second one of said ports into the register, thereby concatenating the data from the first and second ports.

The interface portion may comprise a plurality of ports each arranged to transfer data between the port and an external environment in dependence on a respective second timing signal, and each respective second timing signal may be provided from a different external source.

According to another aspect of the invention, there is provided a method of scheduling threads in a processor having an interface portion and an internal environment, the interface portion comprising at least one port and the internal environment comprising an execution unit and a thread scheduler, the method comprising: operating the execution unit arranged to execute instructions in dependence on a first timing signal and to transfer data between the interior portion and the at least one port in dependence on the first timing signal; operating the thread scheduler to schedule a plurality of threads for execution by the execution unit, each thread comprising a sequence of instructions and the scheduling being the threads in dependence on the first timing signal; transferring data between the at least one port and an external environment in dependence on a second timing signal; altering a ready signal in dependence on said second timing signal to indicate a transfer of data with the external environment; and operating the thread scheduler to schedule one or more associated threads for execution in dependence on the ready signal.

According to another aspect of the invention, there is provided a mobile terminal having a mobile applications processor, at least one peripheral device, and an interface processor connected between the mobile applications processor and the peripheral device, the interface processor having an interface portion and an internal environment, the interface portion comprising at least one port and the internal environment comprising: an execution unit arranged to execute instructions in dependence on a first timing signal and to transfer data between the interior portion and the at least one port in dependence on the first timing signal; and a thread scheduler for scheduling a plurality of threads for execution by the execution unit, each thread comprising a sequence of instructions and the thread scheduler being arranged to schedule the threads in dependence on the first timing signal; wherein the at least one port is arranged to transfer data between the port and the mobile applications processor or peripheral device in dependence on a second timing signal, and to alter a ready signal in dependence on said second timing signal to indicate a transfer of data with the external environment, the thread scheduler being configured to schedule one or more associated threads for execution in dependence on the ready signal.

According to another aspect of the present invention, there is provided an array of interconnected processors, at least one of said processors having an interface portion and an internal environment, the interface portion comprising at least one port and the internal environment comprising: an execution unit arranged to execute instructions in dependence on a first timing signal and to transfer data between the interior portion and the at least one port in dependence on the first timing signal; and a thread scheduler for scheduling a plurality of threads for execution by the execution unit, each thread comprising a sequence of instructions and the thread scheduler being arranged to schedule the threads in dependence on the first timing signal; wherein the at least one port is arranged to transfer data between the port and another processor in the array in dependence on a second timing signal, and to alter a ready signal in dependence on said second timing signal to indicate a transfer of data with the external environment, the thread scheduler being configured to schedule one or more associated threads for execution in dependence on the ready signal.

According to another aspect of the invention, there is provided a processor having an interface portion and an internal environment, the interface portion comprising port means and the internal environment comprising: execution means for executing instructions in dependence on a first timing signal and for transferring data between the interior portion and the port means in dependence on the first timing signal; and thread scheduling means for scheduling a plurality of threads for execution by the execution means, each thread comprising a sequence of instructions and the scheduling by the thread scheduling means being in dependence on the first timing signal; wherein the port means are for transferring data between the port means and an external environment in dependence on a second timing signal, and for altering a ready signal in dependence on said second timing signal to indicate a transfer of data with the external environment, the thread scheduling means being for scheduling one or more associated threads for execution in dependence on the ready signal.

According to another aspect of the invention, there is provided a computer program product for scheduling threads in a processor having an interface portion and an internal environment, the interface portion comprising at least one port and the internal environment comprising an execution unit and a thread scheduler, the program comprising code which when executed by a computer performs the steps of: transferring data between the interior portion and the at least one port in dependence on the first timing signal; operating the thread scheduler to schedule a plurality of threads for execution by the execution unit, each thread comprising a sequence of instructions and the scheduling being in dependence on the first timing signal; transferring data between the at least one port and an external environment in dependence on a second timing signal; altering a ready signal in dependence on said second timing signal to indicate a transfer of data with the external environment; and operating the thread scheduler to schedule one or more associated threads for execution in dependence on the ready signal.

For a better understanding of the present invention and to show how the same may be carried into effect, reference will now be made, by way of example, to the corresponding drawings.

DETAILED DESCRIPTION OF THE DRAWINGS

DETAILED DESCRIPTION OF THE PREFERRED EMBODIMENTS

Figure 1:
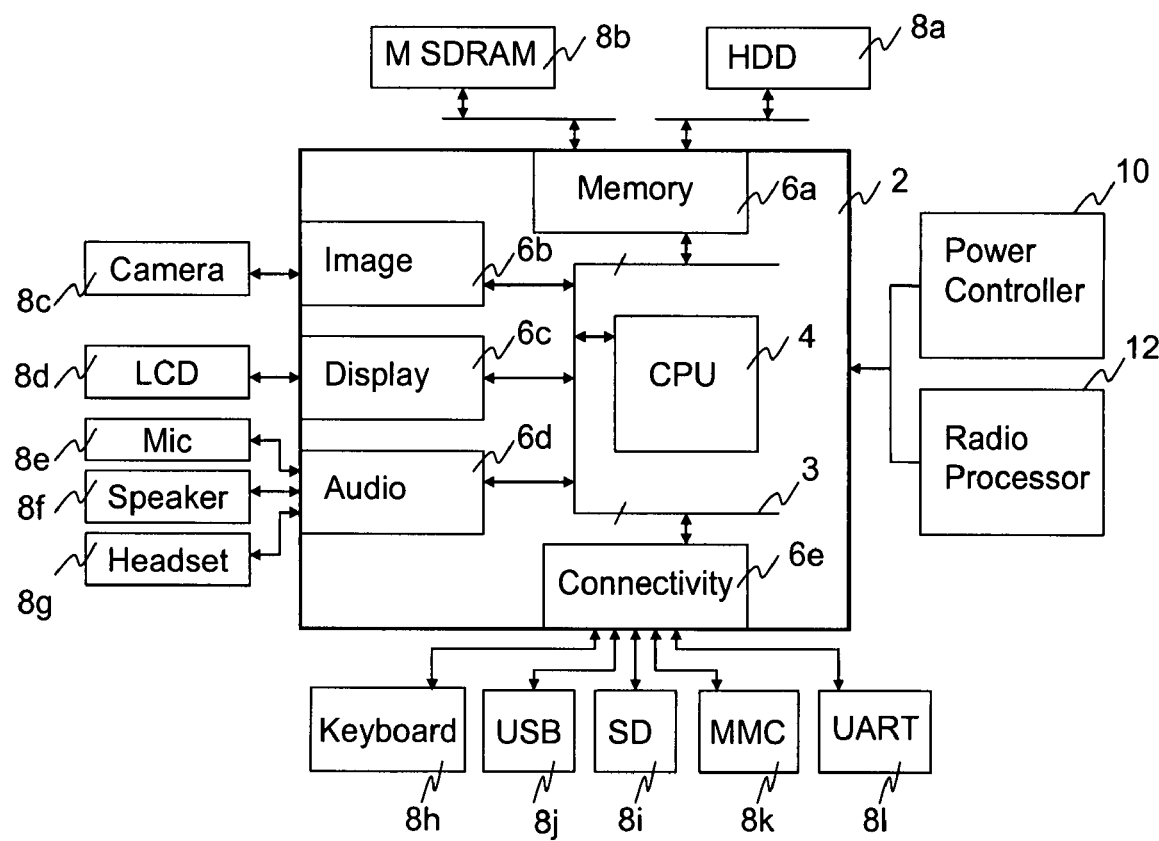
FIG. 1 illustrates an example application of an FPGA device as is known in the art.
Figure 2:
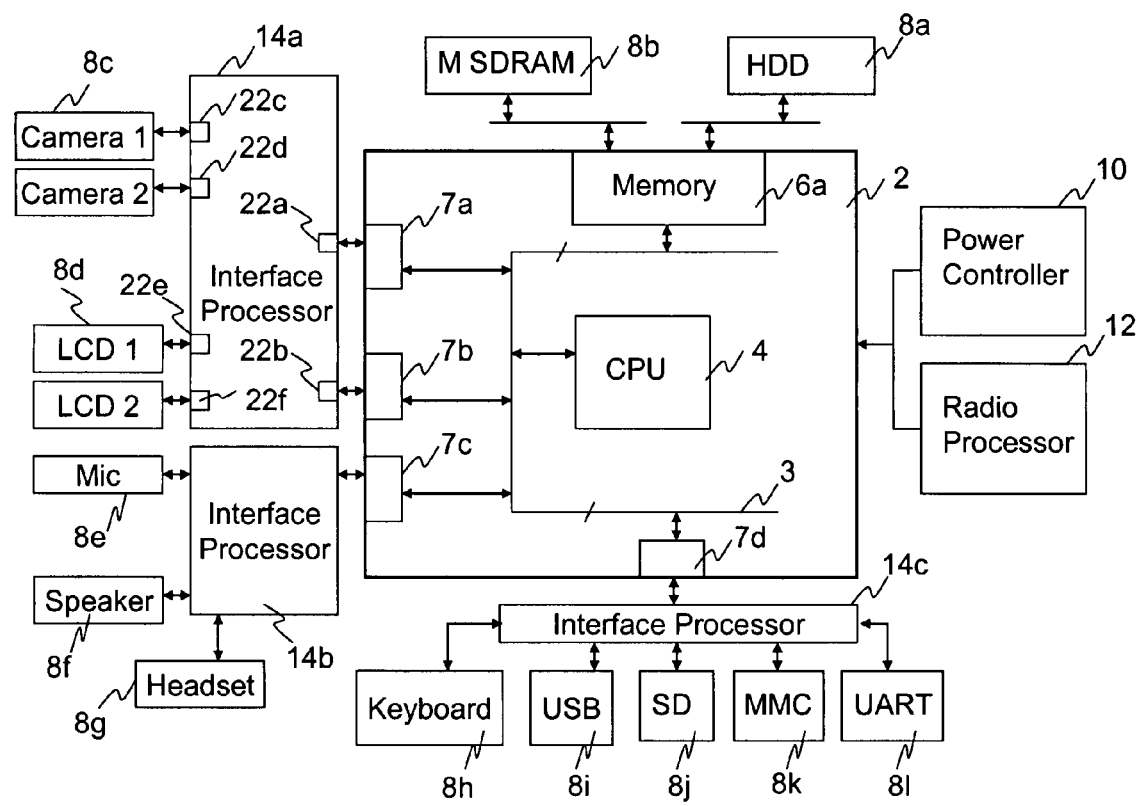
FIG. 2 illustrates an example application of an interface processor.

FIG. 2 shows an exemplary application of interface processors in a mobile telephone. The mobile applications processor 2 needs to communicate with the plurality of peripheral devices 8. As in FIG. 1, the applications processor 2 comprises a bus 3, a CPU 4, and a memory controller 6a for interfacing with a hard-drive (HDD) 8a and a SDRAM memory 8b, as well as a power controller 10 and radio processor 12.

However, in place of dedicated controllers 6, the arrangement of FIG. 2 allows the CPU 4 to communicate externally via generic ports 7. In this example, generic ports 7a and 7b are provided for interfacing with cameras 8c and LCD displays 8d; a generic port 7c is provided for interfacing with a microphone 8e, speaker 8f and headset 8g; and a generic port 7d is provided for interfacing with a keyboard 8h, a Universal Serial Bus (USB) device 8i, a Secure Digital (SD) card 8j, an Multi-Media Card (MMC) 8k, and a Universal Asynchronous Receiver/Transmitter (UART) device 8l.

In FIG. 2, interface processors 14a, 14b and 14c are placed at the outputs of the relevant ports 7, with a first interface processor 14a being connected between the image devices 8c-8d and the generic ports 7a-7b, a second interface processor 14b being connected between the audio devices 8e-8g, and a third interface processor 14b being connected between the generic port 7d and the various connectivity devices 8h-8m. The ports 7 need only be general purpose ports because the application-specific display, audio and connectivity functions are implemented by the interface processors 14a-14c in a manner to be described later. The ports 7 need not use FPGA logic, because the interface processors 14 provide the flexibility and configurability that would otherwise be provided by FPGAs. The interface processor 14a has ports 22a and 22b connected to the ports 7a and 7b, and ports 22c, 22d, 22e and 22f connected to the external devices 8c and 8g. The interface processors 14b and 14c have similar ports, not shown in FIG. 2. The interface processors are typically involved in implementing the specific protocols used to transfer data via the interfaces, re-formatting data including converting it between parallel and serial formats, and possibly higher level functions such as encoding it, compressing it or encrypting it.

Figure 2A:
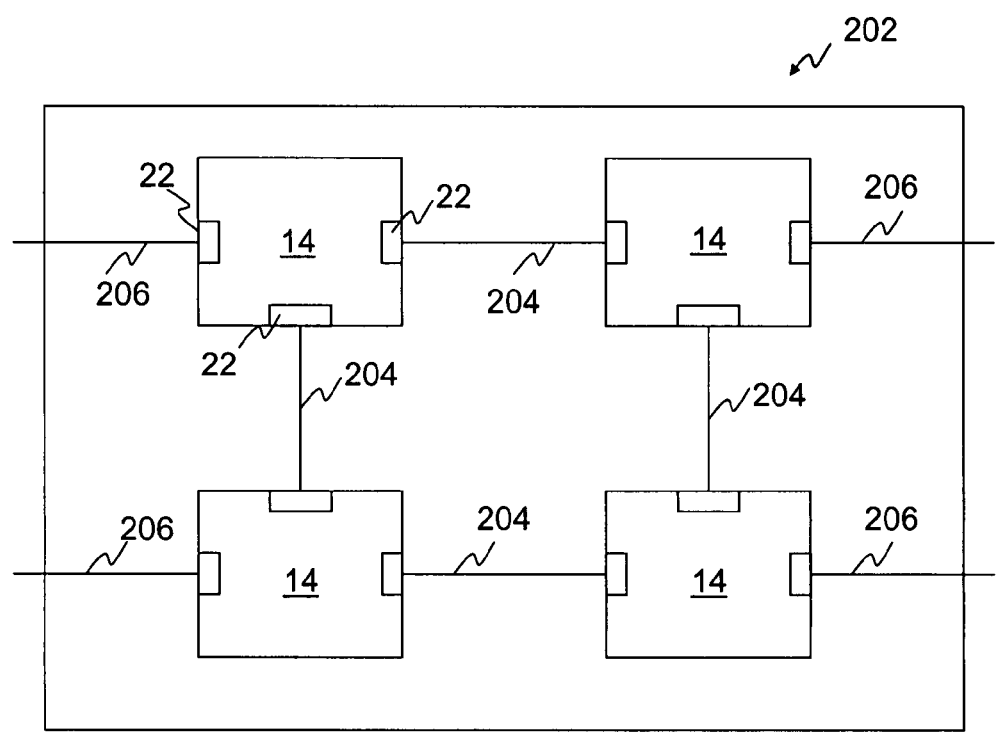
FIG. 2a illustrates another example application of an interface processor.

Another application of an interface processor is as a tile in a multiprocessor chip 202 illustrated in FIG. 2a. Such a chip 202 uses a high performance interconnect 204 which supports communication between the processors 14 on the chip 202, and inter-chip links 206 so that systems can easily be constructed from multiple chips. Each processor 14 is connected to its inter-chip link 206 and high performance interconnects 204 via ports 22.

An important feature of the interface processor which is discussed more fully in the following is its ability to manage activity at the ports 22. Each interface processor comprises a CPU, memory and communications. To allow the direct and responsive connectivity between the CPU and the ports, each processor has hardware support for executing a number of concurrent program threads, each comprising a sequence of instructions, and at least some of which are specifically responsible for handling activity at the ports. As will be discussed more fully in the following, the hardware support includes:

a set of registers for each thread, a thread scheduler which dynamically selects which thread to execute, a set of ports used for input and output (ports 22), a plurality of clocks or clock generators The use of a small set of threads on each processor can be used to allow communications or input/output to progress together with other pending tasks handled by the processor, and to allow latency hiding in the interconnect by allowing some threads to continue whilst others are suspended pending communication to or from remote interface processors.

Figure 3:
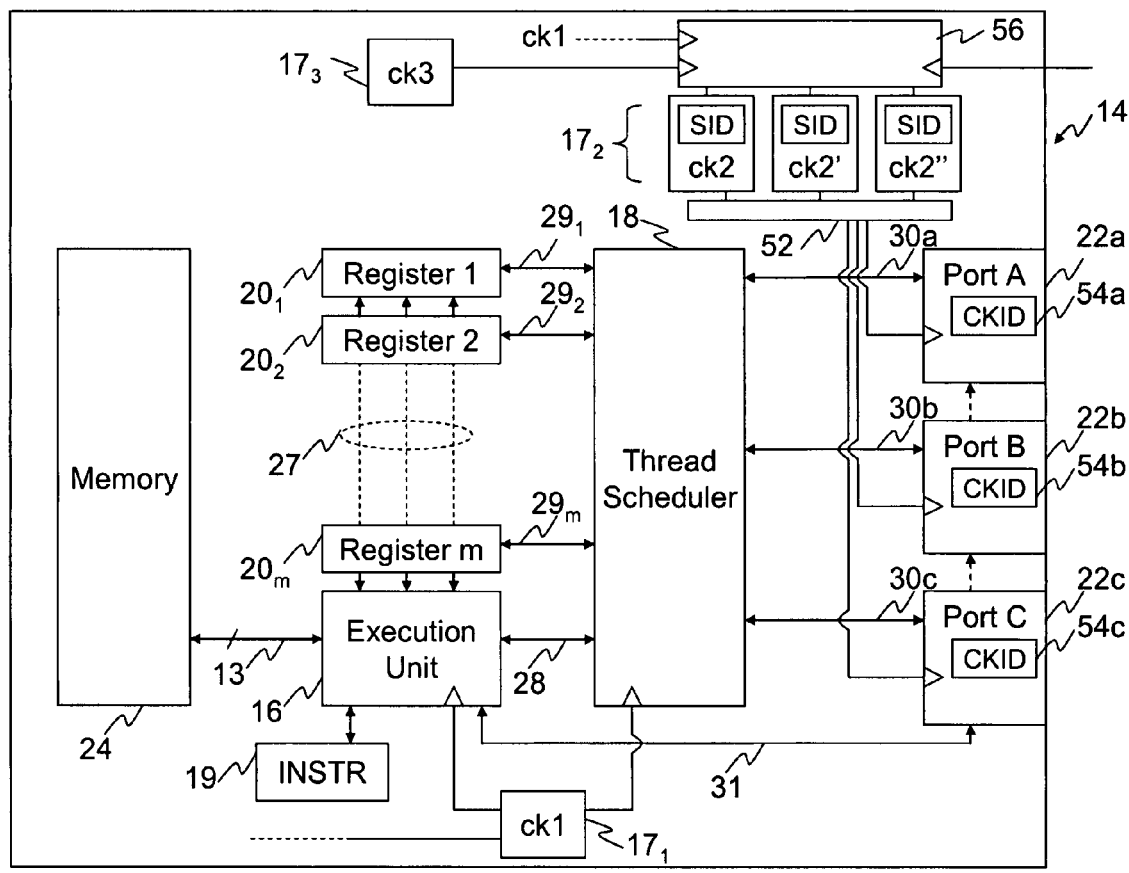
FIG. 3 is a schematic representation of the architecture of an interface processor.

FIG. 3 shows schematically an exemplary architecture of an interface processor 14 according to one embodiment of the present invention. The processor 14 comprises an execution unit 16 for executing threads of instructions under the control of a thread scheduler 18. The processor 14 further comprises a bus 13, a Random Access Memory (RAM) 24 for holding program code and other data, and a Read Only Memory (ROM) (not shown) for storing permanent information such as boot code.

The thread scheduler 18 dynamically selects which thread the execution unit 16 should execute. Conventionally, the function of a thread scheduler would simply be to schedule threads from the program memory in order to keep the processor fully occupied. However, according to the present invention, the scheduling by the thread scheduler 18 is also related to activity at the ports 22. It is noted in this respect that the thread scheduler may be directly coupled to the ports 22 so as to minimise the delay when a thread becomes runnable as a result of an input or output activity at the port.

Each of the m threads under consideration by the thread scheduler 18 is represented by a respective set of thread registers $20_1 \ldots 20_m$ in a bank of registers 20, to which the thread scheduler 18 has access. Instruction buffers (INSTR) 19 are also provided for temporarily holding instructions fetched from memory 24 before being subsequently issued into the execution unit 16. The details of these registers and buffers are discussed later.

Of the m threads, the thread scheduler 18 maintains a set of n runnable threads, the set being termed "run", from which it takes instructions in turn, preferably in a round-robin manner. When a thread is unable to continue it is suspended by removing it from the run set. The reason for this may be, for example, because the thread is awaiting one or more of the following types of activity:

its registers are being initialised prior to it being able to run, it has attempted an input from a port which is not ready or has no data available, it has attempted an output to port which is not ready or has no room for the data, it has executed an instruction causing it to wait for one or more events which may be generated when ports become ready for input.

Note that the term "event" as used herein refers to a particular type of operation, which is slightly different from basic input-output operation. The distinction is discussed below in relation to FIGS. 4 and 5.

The processor also comprises a first clock generator $17_1$ which outputs a first timing signal in the form of a first clock signal ck1; a plurality of second clock generators $17_2$ which each output a respective second timing signal in the form of a second clock signal, ck2, ck2' and ck2" respectively; and a third clock generator $17_3$ which outputs a third timing signal in the form of a third clock signal ck3. As a matter of convenient terminology, the ports 22 and second clocks ck2, ck2' and ck2" may be considered schematically as an interface portion of the processor; and the execution unit 16, thread scheduler 18, first clock $17_1$, third clock $17_3$ and other components such as the bus 13 and memory 24 may be considered schematically as an internal environment of the processor. Any external device, entity or stimulus with which the processor interacts may be considered as part of the external environment.

The first and third clock generators $17_1$ and $17_3$ are preferably clock sources. Each of the second clock generators $17_2$ is arranged to derive its respective clock signals ck2, ck2' and ck2" from any one of the first clock signal ck1, the third clock signal ck3, and an external clock signal received via a one-bit port. Each of the second clock generators $17_2$ also has an eight-bit divider for optionally dividing the received clock signal by a specified factor. To select the received clock signal, each clock generator $17_2$ comprises a source register SID which stores an identifier of the respective clock source to be used by that generator. A switch box 56 is arranged to connect either the first clock signal ck1 or an external clock signal to the respective second clock generators $17_2$. Thus, each of the second clock generators $17_2$ can have a different clock source and/or division factor.

The execution unit 16 and the thread scheduler 18 are clocked by the first clock signal ck1. This means threads are scheduled in turn from the run set in time with the first clock signal ck1; and the instructions of the those threads are fetched from memory 24, issued into the execution unit 16 and executed in time with the first clock signal ck1. Some of these instructions will include input and output instructions, such that the transfer of data between the interior portion and the port is performed in time with the first clock signal ck1. That is, these tasks are triggered by edges of the first clock signal ck1.

Each port 22 is clocked by a selected second clock signal. Any of the second signals ck2, ck2' and ck2" can be selected for output to any of the ports 22 by means of a switch box 52.

To facilitate the selection, each port 22 is associated with a corresponding register CKID 54 which stores an identifier of one of the second clock generators $17_2$. The switch box 52 is arranged to supply the second clock signal from the identified clock generator to the corresponding port. For the purposes of the following discussion, it will be assumed that the second clock signal ck2 is selected for clocking a port 22. This means data is transferred between the port 22 and the external environment in time with the second clock signal ck2, and also that the availability of data for input and the availability of the port for output are signalled in time with the second clock signal ck2. That is, these tasks are triggered by edges of the second clock signal ck2. The operation of the ports 22 is discussed in more detail below in relation to FIG. 4.

Note that when transferring data between clock domains, some kind of synchronisation will be required in order to avoid metastability, which is a problem that occurs if data is inadvertently read whilst the data signal is changing state. Synchronisation techniques for avoiding metastability are well known in the art, and are not discussed further herein.

Advantageously, in order to facilitate rapid reaction time, a direct hardwired connection 28 is provided between the thread scheduler 18 and the execution unit 16 to allow the thread scheduler 18 to control which thread or threads the execution unit 16 should fetch and execute. Direct hardwired paths 30a, 30b, 30c are also provided between the thread scheduler 18 and each of the ports 22; and direct hardwired paths $29_1 \ldots 29_m$ are provided between the thread scheduler 18 and each of the registers 20. These direct paths preferably provide control paths which allow the thread scheduler to associate a respective thread with one or more of the ports 22, and particularly to return ready indications from the ports when certain activity occurs, allowing the processor to respond quickly to activity or stimuli occurring at the ports 22. The operation of the thread scheduler in relation to the ports is discussed below with regard to FIGS. 4 and 6.

The execution unit 16 also has access to each of the ports 22a-22c and each of the registers $20_1$-$20_m$ via direct connections 27 and 31, thus providing a direct link between the core processor, registers, and the external environment. Preferably, these direct paths provide further control paths allowing the execution unit to pass conditions to the ports. This is discussed in further detail below with regard to FIG. 4. The direct paths 27 and 31 may also allow data to be input and output directly between the thread registers 20 and the ports 22, thus allowing threads to communicate directly with the external environment. For example, data may be written directly from an external device to one of a thread's operand registers, rather than being written to memory 24 and then subsequently fetched. Conversely, following an operation, data from an operand register may be picked up by the execution unit 16 and sent directly out of a port 22. This improves reaction time significantly.

Note that by "direct connection" or "direct path" it is meant a connection separate from the connection between the execution unit and the program memory 24. Thus, for example, the thread scheduler 18 and execution unit 16 have access to data input from ports 22 without that data being stored and then subsequently fetched from memory 24. Particularly, if the connection between the execution unit 16 and memory 24 is via a bus 13, then a "direct" connection or path means one which is separate from the bus. Thus the various communications between ports 22, registers 20, thread scheduler 18 and execution unit 16 can all occur without the need for bus arbitration, improving reaction time. The ports 22 may also be provided with an additional connection (not shown) with the bus 13.

The term "port" as used in this application can refer to either a "pin port" or a "data port". A pin port is the immediate interface to a single pin. It is the logic responsible for detecting individual logical transitions, i.e. rising and falling edges, of a signal occurring at a pin at the processor chip's physical boundary. Data ports are "higher level" in that they can handle one or more bits, typically accumulated in an I/O buffer, and typically making up a portion of data such as a word. Instead of detecting rising and falling edges, a data port handles the state or logic level of a bit or bits at a particular instant. A data port may be on/off chip, or it may be a port to another processor embedded on the same chip.

Figure 4:
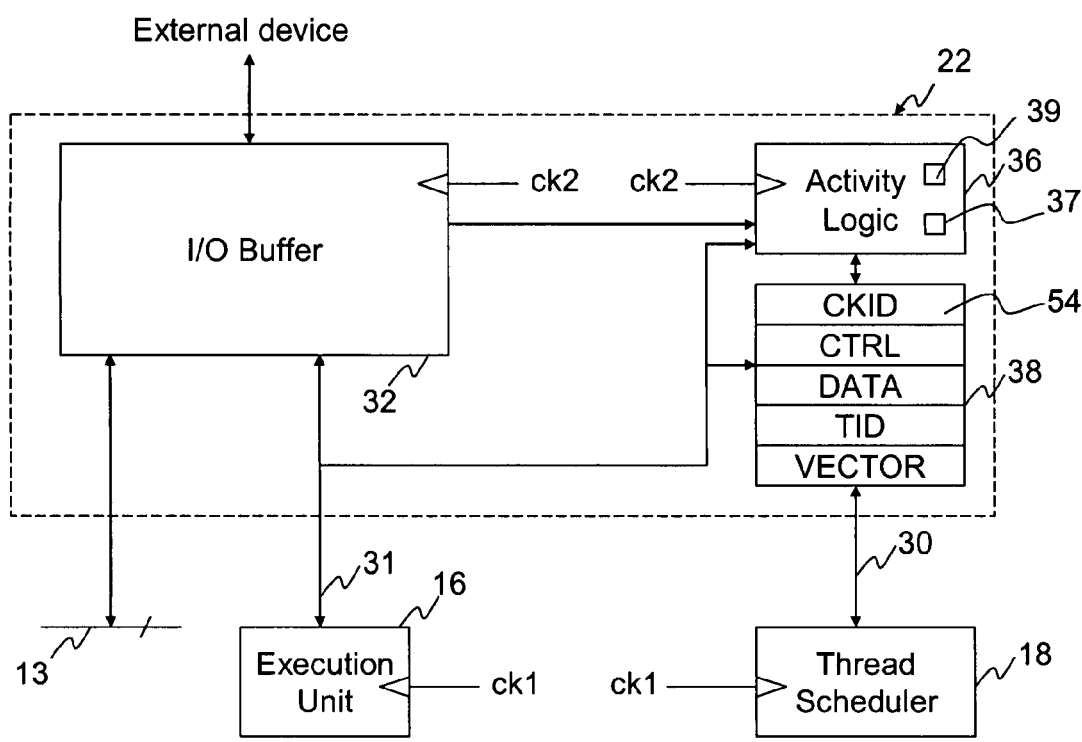
FIG. 4 is a schematic representation of a port.

FIG. 4 shows schematically a port 22 according to a preferred embodiment of the invention. The port 22 comprises an I/O buffer 32 for passing input and output data to and from the processor 14. In addition, each port 22 comprises activity handling logic 36 for monitoring activity occurring at the port and signalling the occurrence of certain activity by means of at least one ready bit or flag 37. The ready flag 37 is preferably signalled to the thread scheduler via direct path 30, and may also be controlled by the execution unit by direct connection 31. Note that the direct connection 31 preferably comprises a number of connections, as illustrated in FIG. 4. Potential activity which the port may detect includes:
data has been input to the port,
some specific data has been input to the port, and/or
the port has become available for output.

To facilitate the detection of such activity, the port 22 is provided with a set of registers 38. These comprises a thread identifier (TID) register for storing an identification of the relevant thread, a control (CTRL) register for storing one or more conditions, a continuation point vector (VECTOR) register for storing the position in the program where execution was suspended, and a data (DATA) register for storing any data associated with a condition. The values TID is written to the registers 38 by the thread scheduler 18 via the direct path 30 (which would be 30a, 30b, 30c in FIG. 3), and the values VECTOR, CTRL and DATA are written by the execution unit 16 via the direct path 31. The TID is returned to the thread scheduler 18 upon detection of the desired activity in order to identify the associated thread. The registers 38 also include the clock generator identifier register CKID 54 which identifies the clock generator $17_2$ for the port. The activity logic also comprises an enable flag 39, which is discussed in further detail below.

Note that although the registers 38 are shown in FIG. 4 as being contained within the port 22, they may in fact be situated elsewhere within the processor 14 and simply associated with the port 22.

The I/O buffer 32 and activity logic 36 are clocked by the selected second clock signal ck2; and the execution unit 16, thread scheduler 18 and bus 13 are clocked by the first clock signal ck1. The I/O buffer's contents are visible to the external environment. That is, if the port is an off-chip port then the data in the I/O buffer 32 will appear on the pins, and if the port is an on-chip port to another processor then data in the I/O buffer will appear on the interconnect 204 between the processors. Data in the I/O buffer will also appear at the input of a bus driver for the bus 13, and is furthermore accessible by the execution unit 16 via a direct connection such as 31.

When performing an input, data is captured into the I/O buffer from the external environment (e.g. from the pins) on an edge of the second clock signal ck2. The activity logic 36 also asserts the ready bit 37 on an edge of the second clock signal. The ready bit 37 is detected by the thread scheduler on an edge of the first clock signal ck1, via direct connection 30. By detecting the asserted ready bit, the thread scheduler ensures that the relevant thread is in the run set. The input data is then acted upon by the execution unit in time with the first clock signal ck1 by completing the execution of an input instruction of that thread, either by placing the data into one or more of the execution unit's registers (including potentially the thread registers 20) or onto the bus 13. Once the input is completed, the execution unit 16 de-asserts the ready bit 37 on an edge of the first clock ck1 signal by a direct path 31.

Note also that if a condition is set in the CTRL and DATA registers 38, then the data captured on an edge of the first clock ck1 is compared against the condition and the ready bit 37 set only when the condition is found by the activity logic 36 to be met.

To perform an output, the ready bit 37 must be de-asserted to indicate that the I/O buffer 32 is not currently involved in an input and is not still involved in a previous output. Assuming the ready bit 37 is de-asserted, this is detected by the thread scheduler on an edge of the first clock signal ck1, via direct path 30. By detecting the de-asserted ready bit, the thread scheduler ensures that the relevant thread is in the run set. The execution unit 16 then makes the output data available to the I/O buffer 32 by completing the execution of an output instruction of that thread in time with the first clock signal ck1, either by presenting the data from one or more of the execution unit's registers (including potentially the thread registers 20) or making it available from the bus 13. Upon executing the output instruction, the execution unit 16 also asserts the ready bit 37 via direct path 31, which indicates that the I/O buffer 32 is currently occupied with an output and is not yet available for other subsequent outputs. The output data is then clocked into the I/O buffer 32 on an edge of the second clock signal ck2, making it visible to the external environment. The activity logic 36 also de-asserts the ready bit 37 again on an edge of the second clock signal ck2 to indicate that the output has been presented to the external environment.

Figure 5:
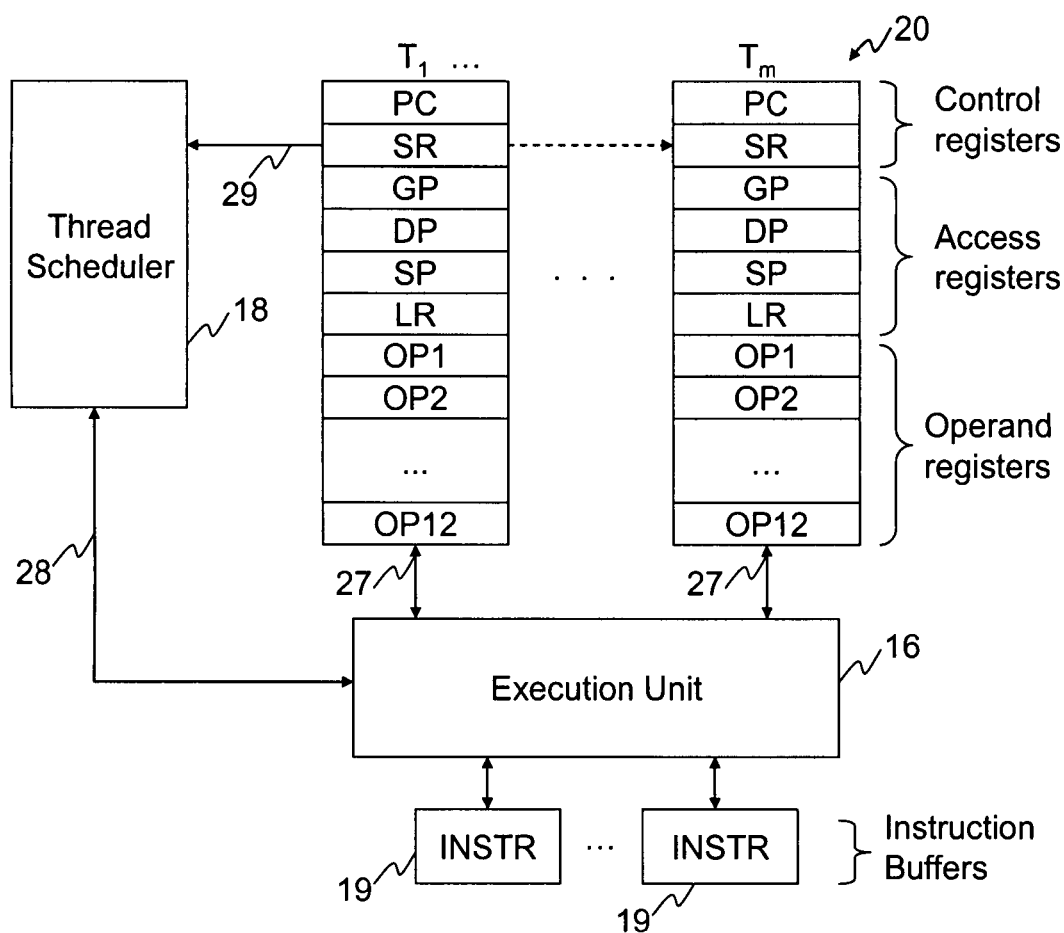
FIG. 5 is a schematic representation of thread register sets.

FIG. 5 shows an exemplary bank of thread registers 20 used to represent the threads. The bank 20 comprises a plurality of sets of registers corresponding to respective threads $T_1$ to $T_m$ which are currently under consideration by the thread scheduler 16. In this preferred example, the state of each thread is represented by eighteen registers: two control registers, four access and twelve operand registers. These are as follows.

Control registers:
PC is the program counter
SR is the status register
Access registers:
GP is the global pool pointer
DP is the data pointer
SP is the stack pointer
LR is the link register
Operand registers: OP1 . . . OP12

The control registers store information on the status of the thread and for use in controlling execution of the thread. Particularly, the ability of a thread to accept events or interrupts is controlled by information held in the thread status register SR. The access registers include a stack pointer used for local variables of procedures, a data pointer normally used for data shared between procedures and a constant pool pointer used to access large constants and procedure entry points. The operand registers OP1 . . . OP12 are used by instructions which perform arithmetic and logical operations, access data structures, and call subroutines.

A number of instruction buffers (INSTR) 19 are also provided for temporarily storing the actual instructions of the thread. Each instruction buffer is preferably sixty-four bits long, with each instruction preferably being sixteen bits long, allowing for four instructions per buffer. Instructions are fetched from program memory 24 under control of the thread scheduler 18 and placed temporarily in the instruction buffers 19.

The execution unit has access to each of the registers 20 and buffers 19. Further, the thread scheduler 18 has access to at least the status register SR for each thread.

As mentioned above, the term "event" as used herein refers to a particular type of operation, or to the activity corresponding to that particular type of operation. Event based operations are slightly different from basic input-output operations, and work as follows. An event is first set for a thread by transferring a continuation point vector from the execution unit 16 and a thread identifier from the thread scheduler 18 to the VECTOR and TID registers 38 associated with a port 22, preferably via direct paths 31 and 30. An associated condition and condition data may also be written to the CTRL and DATA registers 38 of the port 22. The event is thus set at the port, but not necessarily enabled. To enable the port to generate an indication of an event, the port's enable flag 39 must also be asserted, preferably by the thread scheduler 18 via direct path 30. Further, to enable the thread itself to accept events, the thread's event enable (EE) flag in the respective status register SR for the thread must be set to event-enabled. Once the event is thus set and enabled, the thread can be suspending awaiting the event using an event-based wait instruction which acts on the thread scheduler 18. At this point, the current pending instruction may be discarded from the relevant instruction buffer 19. When the event occurs, e.g. some data is input to the port, the occurrence is signalled by the return of the thread identifier and continuation point vector from the port 22 to the thread scheduler 18 and execution unit 16, allowing the instruction at the continuation point vector to be fetched from program memory 24 into an instruction buffer 19 and execution resumed at the appropriate point in the code.

When the event occurs, the thread's EE flag in the respective status register SR may be set to event-disabled to prevent the thread from reacting to events immediately after the occurs. The enable flag 39 may be de-asserted as a result of the thread executing instructions when the event occurs.

The enable flag 39 can be asserted whilst setting up a number of ports in preparation for waiting for an event from one or more of the ports. The thread's EE flag may also be set to event-enabled prior to enabling a set of port enable flags and in this case the first port to be enabled which is ready will generate and event causing the current instruction to be discarded and execution to proceed by immediately fetching and executing the instruction at the continuation point vector.

The advantage of the port's enabling flag 39 and status register EE flag is that the enabling and disabling of events is separated from both the setting up of the events and the suspension of a thread by a wait instruction, allowing different input and output conditions to be readily toggled on and off for a particular thread and/or for various different threads. For example, an event may be left set up at a port 22 even though the event is disabled. Thus events may be re-used by a thread because, although the event has already occurred once, the thread identifier, continuation point vector and condition are still stored in the TID, VECTOR, CTRL and DATA registers 38 of the port 22. So if the thread needs to re-use the event, the port's registers 38 do not need to be re-written, but instead the port's enable flag 39 can simply be re-asserted and/or the EE flag in the status register SR for a thread can be re-set to event-enabled. A further wait instruction will then suspend the thread pending a re-occurrence of the same event.

Furthermore, the use of continuation point vectors allows multiple events to be enabled per thread. That is, a given thread can set up one event at one port 22a by transferring a continuation point vector to that port, set up another event at another port 22b by transferring a different continuation point vector to that other port, and so forth. The thread can also enable and disable the various events individually by separately asserting or de-asserting the different enable flags 39 for each respective port. A wait instruction will then cause the thread to be suspended awaiting any enabled event.

In contrast with events, using basic I/O operations the thread scheduler 18 does not transmit a continuation point vector to the VECTOR register, and does not use the port's enable flag 39 or the EE flag in the status register SR. Instead, the pending instruction is simply left in an instruction buffer 19, and if necessary execution is simply paused pending either an input or the availability of the port for output, as indicated by the ready flag 37. In embodiments, only the TID register may be required for scheduling according to a basic I/O. A basic I/O may or may not use a condition in the CTRL and DATA registers. If such a condition is not used, the I/O will simply be completed as soon as the port is ready.

Note also that once execution of a thread is resumed following an event, it may of course subsequently perform a basic I/O operation. Conversely, once a thread is resumed following a basic I/O, it may subsequently include an event operation. Any such chain of events and I/Os may be included in a thread. For example, a basic I/O operation may be interleaved between two event-based wait operations while the event is disabled (i.e. while the port's enable flag 39 and/or the status register's EE flag is de-asserted) but while the event vector and condition are still left set in the registers 38. That is, the event may be disabled following completion of a first event-based wait operation, a basic I/O subsequently performed using the same port, and then the same event re-enabled for use in a second event-based wait operation. As discussed above, the basic I/O operation pauses and un-pauses the thread but does not effect the port's enable flag 39 or the EE flag in the status register, nor transfer control to the event vector.

Figure 6:
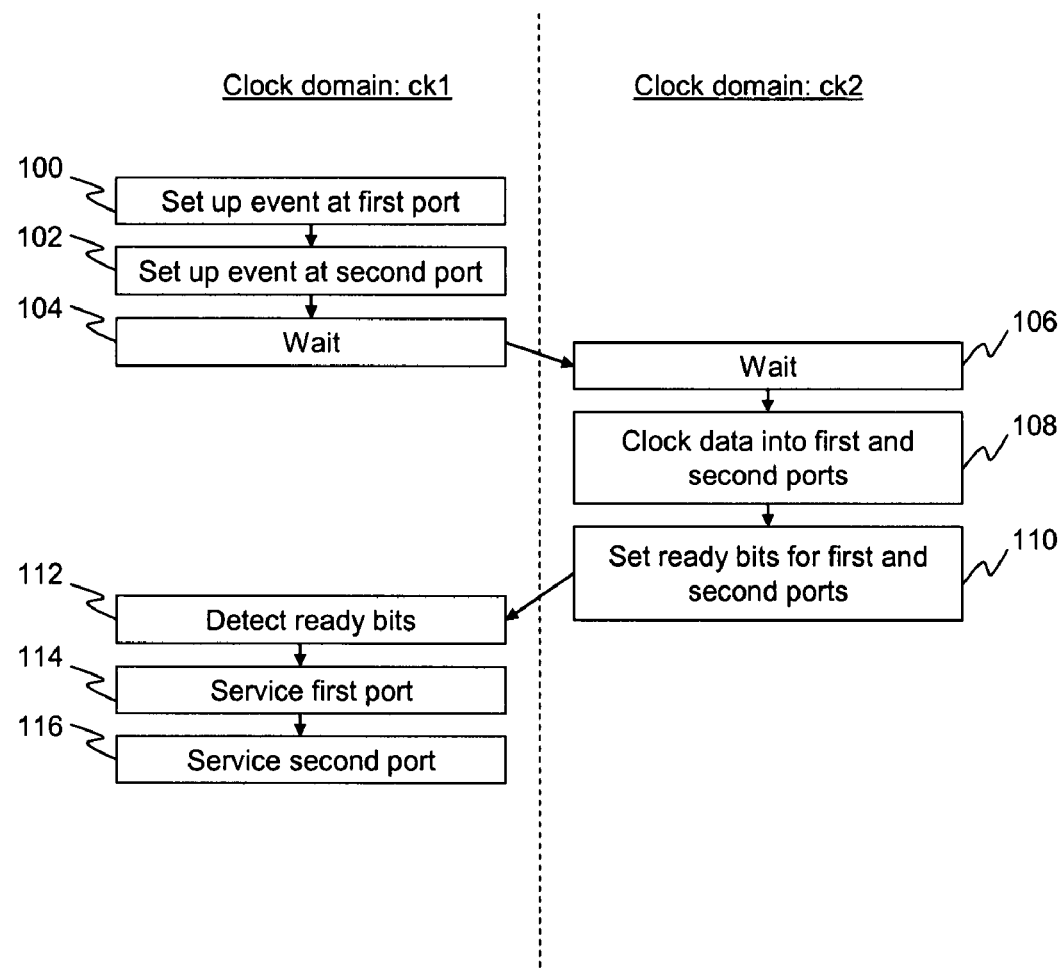
FIG. 6 is a flow diagram illustrating the operation of the thread scheduler.

The operation of the thread scheduler and an exemplary port is now described with reference to the flow diagram of FIG. 6. At step 100, the execution unit 16 and thread scheduler set up an event for a thread using the TID, VECTOR, CTRL and DATA registers 38 at a first port as discussed above. In this example, the event is the input of some specific data at the port. At step 102, the execution unit 16 and thread scheduler 18 set up another input event at a second port in a similar manner for the same thread. At step 104, the execution unit 16 executes a wait instruction to wait for the events, and the thread scheduler suspends the thread by removing it from the run set. Steps 100 to 104 occur in the first clock domain ck1.

At step 106, the respective activity logic 36 for each port filters the data arriving at those ports, looking for the relevant data. In an advantageous embodiment, the external device which is inputting the data to the processor 14 "sees" the first and second ports as a single port, because both clocks are clocked by the same clock signal, i.e. the second clock signal ck2. The external device thus inputs the data from the two ports simultaneously as a word having width of the two ports combined. The desired data arrives at step 108, and at step 110 the activity logic 36 asserts the ready bit 37 to indicate as such. Steps 106-110 occur in the second clock domain ck2.

At step 112, the thread scheduler detects the asserted ready bit 37 and returns the suspended thread to the run set. Because both ports are ready, and the execution unit can service each port individually in a clock domain separate from that of the ports, then the execution unit 16 can service the data from the two points individually, depending on the order required by the code. Thus, at step 114 the execution unit 16 receives and operates upon the data from the first port, and at a subsequent step 116 the execution unit receives and operates upon the data from the second port.

Similar such sequences as described in relation to FIG. 7 may be implemented in other threads for servicing one or more other ports, for performing either input and/or output of data. If multiple threads become runnable, the thread scheduler 18 may determine which to schedule next, for example by the order of the round robin scheme.

Thus it can be seen how the scheduling of multiple threads, as well as the servicing of ports handled by those threads, is advantageously separated from the timing of ports.

The interface processor can support several programming approaches due to its thread-based structure. It can be treated as a single conventional processor performing standard input and output, or it can be programmed as part of a parallel array of hundreds of communicating components. An instruction set is provided which supports these options. The instruction set includes special instructions which support initialisation, termination, starting and stopping threads and provide input/output communication. The input and output instructions allow very fast communications with external devices. They support high-speed, low-latency input and output and high-level concurrent programming techniques. Their application therein to handling port activity is discussed more fully in the following, which describes example instructions that can be used to implement the present invention.

Ports can be used in input or output mode. In input mode a condition can be used to filter the data passed to the thread. A port can be used to generate events or interrupts when data becomes available as described below. This allows a thread to monitor several ports, only servicing those that are ready. Input and output instructions, IN and OUT, can be used to transfer of data to and from ports once ready. In this case, the IN instruction inputs and zero-extends the n least significant bits from an n-bit port and the OUT instructions outputs the n least significant bits.

Two further instructions, INSHR and OUTSHR, optimise the transfer of data. The INSHR instruction shifts the contents of a register such as an operand register right by n bits, filling the left-most n bits with the data input from the n-bit port. The OUTSHR instruction outputs the n least significant bits of data to the n-bit port and shifts the contents of a register right by n bits.

| OUTSHR port, s | port ◁ s[bits 0 for width(port)]; s ← s >> width(port) | output from port and shift |
|---|---|---|
| INSHR port, s | s ← s >> width(d); port ▷ s[bits (bitsperword − width(d)) for width(d)] | shift and input from port | where the " ▷ " represents a conditional input and the "◁" represents a conditional output.

The INSHR instruction may be used to shift data by the width of a port. This allows data input from one port to be shifted and then concatenated with data input from another port into the same register.

A port must be configured before it can be used. It is configured using the SETC instruction which is used to define several independent settings of the port. Each of these has a default mode and need only be configured if a different mode is needed.

| SETC port, mode | port[ctrl] ← mode | set port control |
|---|---|---|

The effect of the SETC mode settings is described below. The first entry in each setting is the default mode.

| Mode | Effect |
|---|---|
| OFF | port not active; pin(s) high impedance |
| ON | active |
| IN | port is an input |
| OUT | port is an output (but inputs return the current pin value) |
| RAW | data is transferred directly to and from the pins |
| CLOCKED | data transfers are synchronised with a clock |
| EVENT | port will cause events |
| INTERRUPT | port will raise interrupts |
| DRIVE | pins are driven both high and low |
| PULLDOWN | pins pull down for 0 bits, are high impedance otherwise |
| PULLUP | pins pull up for 1 bits, but are high impedance otherwise |
| RISING | rising edge of the port's clock is the primary (capture) edge |
| FALLING | falling edge of the port's clock is the primary (capture) edge |
| DATAPORT | port acts as normal |
| CLOCKPORT | port's clock is tied directly to its output |
| UNCOND | port always ready; inputs complete immediately |
| EQUAL | port ready when its value is equal to its DATA value |
| NE | port ready when its value is different from its DATA value |
| TRANSITION | port ready when its value changes towards its DATA value |
| GR | port ready when its value is greater than its DATA value |
| LS | port ready when its value is less than its DATA value |

The DRIVE, PULLDOWN and PULLUP modes are only relevant when the port direction is OUT. The TRANSITION condition is only relevant for 1-bit ports and the GR and LS conditions are only relevant for ports with more than one bit.

Each port has a ready bit 37 which is used to control the flow of data through the port, and defines whether the port is able to complete input or output instructions. The ready bit is set in different ways depending on the port configuration. The ready bit is cleared when any of the SETC, SETD or SETV instructions are executed.

A port in input mode can be configured to perform conditional input. The condition filters the input data so that only data which meets the condition is returned to the program. When a condition is set, the IN and INSHR instructions will only complete when the port is ready. As described above, executing an input instruction on a port which is not ready will pause the thread. When ready, the port sets its ready bit which is signalled to the thread scheduler. The thread resumes and re-executes the input instruction. This time the port is ready, the data is returned and the ready bit 37 is cleared.

Once a port ready bit is set, the data value which satisfied the condition is captured so that the software gets the value which met the condition even if the value on the port has subsequently changed. When an IN or INSHR instruction is executed and the ready bit is set then the data is returned and the ready bit cleared. If the ready bit is not set then the thread is paused until the ready bit is set. If a condition is set then the data is compared against the condition and the ready bit is only set when the condition is met.

When the OUT or OUTSHR instruction is executed if the ready bit is clear then the data is taken by the port and the ready bit is set. If the ready bit is set then the thread is paused until it is cleared by the port.

Events and interrupts allow ports to automatically transfer control to a predefined event handler. The ability of a thread to accept events or interrupts is controlled by information held in the thread status register SR (see FIG. 4), and may be explicitly controlled using TSE and TSD instructions. This information comprises an event enable flag (EE) and an interrupt enable flag (IE).

| TSE s | SR ← SR ∨ s | thread state enable |
|---|---|---|
| TSD s | SR ← SR ∧ ¬s | thread state disable |

The operand of these instructions should be one of:

| EE | to enable or disable events |
|---|---|
| IE | to enable or disable interrupts |

Events are handled in the same scope in which they were set up. Hence, on an event all the thread's state is valid, allowing the thread to respond rapidly to the event. The thread can perform input and output operations using the port which gave rise to an event whilst leaving some or all of the event information unchanged. This allows the thread to complete handling an event and immediately wait for another similar event.

The program location of the event handler must be set prior to enabling the event using the SETV instruction. Ports have conditions which determine when they will generate an event; these are set using the SETC and SETD instructions.

Event generation by a specific port can be enabled using an event enable unconditional (EEU) instruction and disabled using an event disable unconditional (EDU) instruction. The event enable true (EET) instruction enables the event if its condition operand is true and disables it otherwise; conversely the event enable false (EEF) instruction enables the event if its condition operand is false, and disabled it otherwise. These instructions are used to optimise the implementation of guarded inputs. Below are some example instruction formats for configuring events on ports.

| SETV port, v | port[vector] ← v | set event vector |
|---|---|---|
| SETD port, d | port[data] ← d | set event data |
| SETC port, c | port[ctrl] ← c | set event control |
| EET port, b | port[enable] ← b; port[tid] ← thread | event enable true |
| EEF port, b | port[enable] ← ¬b; port[tid] ← thread | event enable false |
| EDU port | port[enable] ← false; port[tid] ← thread | event disable |
| EEU port | port[enable] ← true; port[tid] ← thread | event enable |

Having enabled events on one or more ports, a thread can use a WAITEU instruction to wait for at least one event. This may result in an event taking place immediately with control being transferred to the event handler specified by the corresponding event vector with events disabled by clearing the EE (event enable) flag. Alternatively the thread may be suspended until an event takes place—in this case the EE flag will be cleared when the event takes place, and the thread resumes execution.

| | | |
|---|---|---|
| WAITET b | if b then SR[EE] ← true | event wait if true |
| WAITEF b | if ¬b then SR[EE] ← true | event wait if false |
| WAITEU | SR[EE] ← true | event wait |
| CLRE | SR[EE] ← false;<br>forall port<br>if port[tid] = thread then<br>port[enable] ← false | disable all events<br>for thread |

To optimise the common case of repeatedly waiting for one or more events until a condition occurs, conditional forms of the event wait instruction are provided. The WAITET instruction waits only if its condition operand is true, and the WAITEF waits only if its condition operand is false.

All of the events which have been enabled by a thread can be disabled using a single CLRE instruction. This disables event generation in all of the ports which have had events enabled by the thread. The CLRE instruction also clears the event-enabled status in the thread's status register.

In order to optimise the responsiveness of a thread to high priority ports, the TSE EE instruction can be used to enable events on a thread first before subsequently starting to enable the ports and using one of the event wait instructions. This way, the processor can scan through the ports in priority order. This may cause an event to be handled immediately as soon as it is enabled.

In contrast to events, interrupts are not handled within the current scope and so the current PC and SR (and potentially also some or all of the other registers) must be saved prior to execution of the interrupt handler. On an interrupt generated by port r the following occurs automatically:
SAVEPC←PC;
SAVESR←SR;
SR[EE]←false;
SR[IE]←false;
PC←r[vector]

When the handler has completed, execution of the interrupted thread can be performed by an RFINT instruction.

| | | |
|---|---|---|
| RFINT | PC ← SAVEPC;<br>SR ← SAVESR | return from interrupt |

Each processor preferably has a clock (the third clock $17_3$) which ticks at 100 MHz. It is possible to synchronise input and output operations with either this internally generated clock or with an externally supplied clock. A set of clock generators $17_2$ is provided to do this and each of them can use either the clock $17_3$, the clock $17_1$, or an external one-bit clock as its clock source.

Each clock generator also has an eight-bit divider. When this is set to zero, a source signal passes directly to its output. The rising edge of the source clock is used to perform the division. Hence a setting of 1 will result in an output from the clock generator which changes each rising edge of the input, halving the input frequency f; and a setting of i will produce an output frequency f/2i.

The processor maintains a set of available resources for a thread, such as clock generators and ports. Resources are allocated for use by a thread with a GETR instruction. A clock generator $17_2$ is allocated with a GETR CLOCK instruction. Its division factor and source then need to be configured before it can be used.

The source of the clock generator $17_2$ is set with the SETCLK instruction. If the operand specifies a one-bit port then that port is used as the clock input. The division factor is set using the SETD instruction. The lowest eight bits of the operand are used and the rest ignored.

| | | |
|---|---|---|
| SETCLK generator, s | generator[sid] ← s | set clock generator's source |

Once the clock generator has been configured, the input ports which are to be clocked from that clock generator need to be attached to it. This is also done using the SETCLK instruction on the port to attach, specifying the clock generator ID as the other operand.

| | | |
|---|---|---|
| SETCLK port, s | port[ckid] ← s | set port's clock generator |

When an output port 22 is driven from a clock generator $17_2$, the data on the pin(s) changes state simultaneously with an edge of the corresponding clock signal, e.g. ck2. If several output ports are clocked by the same clock signal, they will appear to operate as single output port, even though the processor may be supplying data to them at different times. Similarly, if an input port 22 is driven from a clock generator $17_2$, the data will be sampled synchronously with an edge of the corresponding clock signal, and if several input ports are clocked by the same clock signal they will appear to operate as a single input port even though the processor may be taking data from those ports at different times. Alternatively, each port could be clocked by a different second clock signal ck2, ck2', ck2", etc. For example, each could be clocked by a clock signal generated from a different external clock source.

The use of clocked ports therefore decouples the internal timing of input and output program execution from the synchronous operation of the input and output interfaces.

A port is clocked when it is set to CLOCKED mode. The clock input comes from a clock generator and is set using the SETCLK instruction with the clock generator ID as the operand.

The clock edge on which the data is captured and presented at the output is set by setting RISING and FALLING mode, determined by the EDGE setting. When the mode is configured as RISING, the rising edge is the primary edge and the falling edge is the secondary edge. When the mode is configured as FALLING, the falling edge is the primary edge and the rising edge is the secondary edge.

Input data is captured from the pins on the primary edge. On this edge the ready bit is also set. When an IN or INSHR instruction is executed and the ready bit is set, then the data is returned and the ready bit cleared. If the ready bit is not set, the thread is paused until the ready bit is set.

If a condition is set then the data captured on the clock edge is compared against the condition and the ready bit is set only when the condition is met.

Output data is sent on the secondary edge. This edge also clears the ready bit. When the OUT or OUTSHR instruction is executed, if the ready bit is clear then the data is registered and the ready bit set, and if the ready bit is set then the thread is paused until it is cleared.

If the clock generator is set to generate the second clock signal from an external clock source, then paused inputs and outputs can be released according to that external clock reference. This facilitates rapid reaction time to external stimuli.

The CLOCKPORT mode of the port causes the selected second clock signal ck2, rather than data, to be output from the corresponding port. This mode can be used to synchronise the interface between the processor and an external device to which it is connected. For example, this feature could be used to synchronise the second clock signals of two interface processors 14 in an array as shown in FIG. 2A, such that the interface between them is clocked by a common second clock signal but each processor 14 runs internally according to its own respective first clock. In DATAPORT mode, the port simply inputs or outputs data.

The following example is a simple use of clocked ports. An external clock source, ck, is used to supply the clock to an input port ("inport") and an output port ("outport"). The data is taken from inport, used to access a corresponding output value in a lookup table, and the value is then output via outport. Data will be sampled from inport on the edge of ckport, and will be valid on outport on the edge of ckport. Inport and outport are assumed to be 4-bit wide ports.

|  |  |
| --- | --- |
| GETR | ck, CLOCK |
| SETCLK | ck, ckport |
| SETC | inport, CLOCKED |
| SETCLK | inport, ck |
| SETC | outport, CLOCKED |
| SETCLK | outport, ck | loop:

|  |  |  |
| --- | --- | --- |
| IN | inport, d | |
| LDW | q, lookup, d | // load into register from look-up table |
| OUT | outport, d | |
| BBU | loop | // branch |

The following example shows how two 4-bit input ports can be used as if they were a single 8-bit input port, and two 4-bit output ports can be used as if they were a single 8-bit output port.

|  |  |
| --- | --- |
| GETR | ck, CLOCK |
| SETCLK | ck, ckport |
| SETC | inport1, CLOCKED |
| SETCLK | inport1, ck |
| SETC | inport2, CLOCKED |
| SETCLK | inport2, ck |
| SETC | outport1, CLOCKED |
| SETCLK | outport1, ck |
| SETC | outport2, CLOCKED |
| SETCLK | outport2, ck | loop:

|  |  |  |
| --- | --- | --- |
| IN | inport1, d | |
| IN | inport2, e | |
| SHL | e, e, 4 | // shift contents of register left |
| OR | d, d, e | |
| LDW | q, lookup, d | |
| OUT | outport1, d | |
| SHR | d, d, 4 | // shift contents of register right |
| OUT | outport2, d | |
| BBU | loop | |

From the above description and examples, it can be seen how separating the timing of scheduling threads from the timing of ports advantageously provides a processor which can respond efficiently to external stimuli.

It will be appreciated that the above embodiments are described only by way of example. As an alternative to clock signals, one or more of ck1, ck2, ck2', ck2" etc. could be replaced with an irregular timing signal or strobe signal. In other embodiments, different sets of registers and instructions may be provided depending on the desired specifications of the chip. In some embodiments, thread identifiers need not be transmitted to ports but could remain the responsibility of the thread scheduler, or be stored elsewhere. Alternatively, each thread could be given an individual ready flag at the port, such that the thread identifier is passed to the port to select the correct ready signal but the thread identifier need not be returned to the thread scheduler upon detection of the activity. Further, conditions and/or condition data need not be transmitted to ports. Instead conditions could be preconfigured at ports and/or conditions could be evaluated at the thread scheduler or elsewhere. Threads may be scheduled based on activity from other sources other than ports. Different interconnects may be provided between the various components of the processor. Also, the invention is not specific to use in a mobile terminal with a mobile applications processor. Other applications and configurations will be apparent to the person skilled in the art. The scope of the invention is not limited by the described embodiments, but only by the following claims.

The invention claimed is:

1. A processor having interface circuitry and internal circuitry, the interface circuitry comprising at least one port and the internal circuitry comprising:
   an execution unit arranged to execute instructions in dependence on a first timing signal and to transfer data between the internal circuitry and the at least one port in dependence on the first timing signal; and
   a thread scheduler for scheduling a plurality of threads for execution by the execution unit, each thread comprising a sequence of instructions and the thread scheduler being arranged to schedule the threads in dependence on the first timing signal;
   wherein the at least one port is arranged to transfer data between the port and circuitry external to the processor in dependence on a second timing signal, and to alter a ready signal in dependence on said second timing signal to indicate a transfer of data with the external circuitry; and
   the thread scheduler is configured such that said scheduling comprises: starting execution of one or more threads each including one of an input instruction and an output instruction which when executed performs a transfer of data between the at least one port and the internal circuitry, then suspending execution of said one or more threads, and then continuing execution of said one or more threads in dependence on the ready signal.

2. A processor according to claim 1, wherein the interface circuitry comprises a plurality of ports arranged to simultaneously transfer data between each port and the external circuitry in dependence on the second timing signal;
   each port is adapted to alter a respective ready signal in dependence on said second timing signal to indicate the transfer with the external environment, said continuation by the thread scheduler being in dependence on the ready signals; and
   the execution unit is arranged to transfer data between the internal circuitry and each of the ports at different times in dependence on the first timing signal.

3. A processor according to claim 1, wherein the transfer between port and external circuitry comprises an input operation whereby data is captured into said at least one port from the external circuitry, and said alteration comprises setting said ready signal into a first state which indicates the availability of that data for input to the internal circuitry.

4. A processor according to claim 1, wherein the transfer between port and external circuitry comprises an output operation whereby data is presented from each of said at least one ports to the external circuitry, and said alteration comprises setting said ready signal into a second state which indicates the availability of the at least one port for further transfer of data with the external circuitry.

5. A processor according to claim 3, wherein the execution unit is adapted to execute an input instruction which inputs data from a port to the internal environment provided that the ready signal is in the first state, the input instruction being included in said one or more threads.

6. A processor according to claim 4, wherein the execution unit is adapted to execute an output instruction which outputs data from the internal environment to a port provided that the ready signal is in the second state, the output instruction being included in said one or more threads.

7. A processor according to claim 5, wherein the execution unit is adapted to set said respective ready signal into the second state upon completion of the input instruction.

8. A processor according to claim 6, wherein the execution unit is adapted to set said respective ready signal into the first state upon completion of the output instruction.

9. A processor according to claim 5, wherein said scheduling by the thread scheduler comprises suspending execution of the input instruction's thread until the respective ready signal is set to said first state.

10. A processor according to claim 6, wherein said scheduling by the thread scheduler comprises suspending execution of the output instruction's thread until the respective ready signal is set to said second state.

11. A processor according to claim 1, wherein:
the transfer between port and external circuitry comprises an input operation whereby data is captured into said at least one port from the external circuitry, and said alteration comprises setting said ready signal into a first state which indicates the availability of that data for input to the internal circuitry;
the transfer between port and external circuitry further comprises an output operation whereby data is presented from each of said at least one ports to the external circuitry, and said alteration comprises setting said ready signal into a second state which indicates the availability of the at least one port for further transfer of data with the external circuitry,
the execution unit is adapted to execute an input instruction which inputs data from a port to the internal environment provided that the ready signal is in the first state, the input instruction being included in said one or more threads;
the execution unit is adapted to execute an output instruction which outputs data from the internal environment to a port provided that the ready signal is in the second state, the output instruction being included in said one or more threads;
the execution unit is adapted to set said respective ready signal into the second state upon completion of the input instruction;
the execution unit is adapted to set said respective ready signal into the first state upon completion of the output instruction.

12. A processor according to claim 1, wherein:
the transfer between port and external circuitry comprises an input operation whereby data is captured into said at least one port from the external circuitry, and said alteration comprises setting said ready signal into a first state which indicates the availability of that data for input to the internal circuitry,
the transfer between port and external circuitry further comprises an output operation whereby data is presented from each of said at least one ports to the external circuitry, and said alteration comprises setting said ready signal into a second state which indicates the availability of the at least one port for further transfer of data with the external circuitry; and
the second timing signal comprises a sequence of alternating primary and secondary edges, and the second timing signal is arranged to trigger the input operation on a primary edge and the output operation on a secondary edge.

13. A processor according to claim 12, wherein said setting of the ready signal into the first state is performed on said primary edge, and said setting of the ready signal into the second state is performed on said secondary edge.

14. A processor according to claim 12, wherein the execution unit is configured to execute a rising mode instruction which sets one of said at least one ports to a rising mode in which said primary edge is a rising edge and said secondary edge is a falling edge, and a falling mode instruction which sets one of said at least one ports to a falling mode in which said primary edge is a falling edge and said secondary edge is a rising edge.

15. A processor according to claim 1, wherein the thread scheduler is configured to maintain a set of runnable threads, and said scheduling by the thread scheduler comprises scheduling threads from said set in dependence on the first timing signal and suspending a thread by removing it from said set.

16. A processor according to claim 1, wherein said external circuitry comprises at least one pin of an integrated circuit in which said processor is housed.

17. A processor according to claim 1, wherein said external circuitry comprises another processor on an integrated circuit in which said processor is housed.

18. A processor according to claim 1, wherein the transfer of data between a port and the internal circuitry comprises a transfer between that port and the execution unit.

19. A processor according to claim 1, wherein the internal circuitry comprises a bus and the transfer of data between a port and the internal circuitry comprises a transfer between that port and the bus.

20. A processor according to claim 1, wherein the internal circuitry comprises a plurality of sets of registers, each set storing information relating to a respective one of said plurality of threads, and the transfer between a port and the internal circuitry comprises a transfer between that port and one of said registers.

21. A processor according to claim 1, wherein at least one of the first and second timing signals is a clock signal.

22. A processor according to claim 1, wherein at least one of the first and second timing signals is an irregular timing signal.

23. A processor according to claim 1, wherein the interface portion comprises a timing signal generator operable to derive the second timing signal from an external timing signal.

24. A processor according to claim 1, wherein interface portion comprises a timing signal generator operable to produce the second timing signal by dividing a frequency of the first timing signal by a factor.

25. A processor according to claim 1, wherein the interface portion comprises a register associated with the at least one port for storing an identifier of a timing signal generator, and a switch box operable to supply the second timing signal from the identified timing signal generator to the port; and the execution unit is configured to execute a set generator instruction to store the identifier.

26. A processor according to claim 24, wherein the execution unit is configured to execute a set factor instruction to allocate said factor.

27. A processor according to claim 1, wherein the at least one port has a data mode in which it transfers data and a timing output mode in which it outputs the second timing signal.

28. A processor according to claim 1, wherein the interface circuitry comprises a plurality of ports and the internal circuitry comprises at least one register, the register being arranged to store data input from a first one of said ports; and
the execution unit is arranged to execute a shift instruction to shift the data in the register by the width of the first port, and to subsequently execute one of said input instructions to input data from a second one of said ports into the register, thereby concatenating the data from the first and second ports.

29. A processor according to claim 1, wherein the interface circuitry comprises a plurality of ports each arranged to transfer data between the port and the external circuitry in dependence on a respective second timing signal, each respective second timing signal being derived from a different external source.

30. A method of scheduling threads in a processor having interface circuitry and internal circuitry, the interface circuitry comprising at least one port and the internal circuitry comprising an execution unit and a thread scheduler, the method comprising:
operating the execution unit to execute instructions in dependence on a first timing signal and to transfer data between the internal circuitry and the at least one port in dependence on the first timing signal;
operating the thread scheduler to schedule a plurality of threads for execution by the execution unit, each thread comprising a sequence of instructions and the scheduling being in dependence on the first timing signal;
transferring data between the at least one port and circuitry external to the processor in dependence on a second timing signal; and
altering a ready signal in dependence on said second timing signal to indicate a transfer of data with the external circuitry;
wherein said scheduling comprises: starting execution of one or more threads each including one of an input instruction and an output instruction which when executed performs a transfer of data between the at least one port and the interior external circuitry, then suspending execution of said one or more threads, and then continuing execution of said one or more threads in dependence on the ready signal.

31. A method according to claim 30, wherein the interface circuitry comprises a plurality of ports, and the method comprises:
simultaneously transferring data between each port and the external circuitry in dependence on the second timing signal;
altering a respective ready signal for each port in dependence on said second timing signal to indicate the transfer with the external circuitry, said continuation being in dependence on the ready signals; and
operating the execution unit to transfer data between the internal circuitry and each of the ports at different times in dependence on the first timing signal.

32. A method according to claim 30, wherein the transfer between port and external circuitry comprises an input operation whereby data is captured into said at least one port from the external circuitry, and said alteration comprises setting said ready signal into a first state which indicates the availability of that data for input to the internal circuitry.

33. A method according claim 30, wherein the transfer between port and external circuitry comprises an output operation whereby data is presented from each of said at least one ports to the external circuitry, and said alteration comprises setting said ready signal into a second state which indicates the availability of the at least one port for further transfer of data with the internal circuitry.

34. A method according to claim 32, comprising operating the execution unit to execute an input instruction which inputs data from a port to the internal environment provided that said ready signal is in the first state, the input instruction being included in said one or more threads.

35. A method according to claim 33, comprising operating the execution unit to execute an output instruction which outputs data from the internal environment to a port provided that said ready signal is in the second state, the output instruction being included in said one or more threads.

36. A method according to claim 34, comprising setting said respective ready signal into the second state upon completion of the input instruction.

37. A method according to claim 35, comprising setting said respective ready signal into the first state upon completion of the output instruction.

38. A method according to claim 34, wherein said scheduling comprises suspending execution of the input instruction's thread until the respective ready signal is set to said first state.

39. A method according to claim 35, wherein said scheduling comprises suspending execution of the output instruction's thread until the respective ready signal is set to said second state.

40. A method according to claim 30, wherein:
the transfer between port and external circuitry comprises an input operation whereby data is captured into said at least one port from the external circuitry, and said alteration comprises setting said ready signal into a first state which indicates the availability of that data for input to the internal circuitry:
the transfer between port and external circuitry further comprises an output operation whereby data is presented from each of said at least one ports to the external circuitry, and said alteration comprises setting said ready signal into a second state which indicates the availability of the at least one port for further transfer of data with the internal circuitry;
the method comprises operating the execution unit to execute an input instruction which inputs data from a port to the internal environment provided that said ready signal is in the first state, the input instruction being included in said one or more threads;
the method comprises operating the execution unit to execute an output instruction which outputs data from the internal environment to a port provided that said ready signal is in the second state, the output instruction being included in said one or more threads;
the method comprises setting said respective ready signal into the second state upon completion of the input instruction; and
the method comprises setting said respective ready signal into the first state upon completion of the output instruction.

41. A method according to claim 30, wherein
   the transfer between port and external circuitry comprises an input operation whereby data is captured into said at least one port from the external circuitry, and said alteration comprises setting said ready signal into a first state which indicates the availability of that data for input to the internal circuitry;
   the transfer between port and external circuitry further comprises an output operation whereby data is presented from each of said at least one ports to the external circuitry, and said alteration comprises setting said ready signal into a second state which indicates the availability of the at least one port for further transfer of data with the internal circuitry; and
   the second timing signal comprises a sequence of alternating primary and secondary edges, and the method comprises triggering the input operation on a primary edge and the output operation on a secondary edge.

42. A method according to claim 41, wherein said setting of the ready signal into the first state is performed on said primary edge, and said setting of the ready signal into the second state is performed on said secondary edge.

43. A method according to claim 41, comprising operating the execution unit to execute a rising mode instruction which sets one of said at least one ports to a rising mode in which said primary edge is a rising edge and said secondary edge is a falling edge, and a falling mode instruction which sets one of said at least one ports to a falling mode in which said primary edge is a falling edge and said secondary edge is a rising edge.

44. A method according to claim 30, comprising operating the thread scheduler to maintain a set of runnable threads, wherein said scheduling comprises scheduling threads from said set in dependence on the first timing signal and suspending a thread by removing it from said set.

45. A method according to claim 30, wherein said external circuitry comprises at least one pin of an integrated circuit in which said processor is housed.

46. A method according to claim 30, wherein said external circuitry comprises another processor on an integrated circuit in which said processor is housed.

47. A processor according to claim 30, wherein the transfer of data between a port and the internal circuitry comprises a transfer between that port and the execution unit.

48. A method according to claim 30, wherein the internal circuitry comprises a bus and the transfer of data between a port and the internal circuitry comprises a transfer between that port and the bus.

49. A method according to claim 30, wherein the internal circuitry comprises a plurality of sets of registers, each set storing information relating to a respective one of said plurality of threads, and the transfer between a port and the internal circuitry comprises a transfer between that port and one of said registers.

50. A method according to claim 30, wherein at least one of the first and second timing signals is a clock signal.

51. A method according to claim 30, wherein at least one of the first and second timing signals is an irregular timing signal.

52. A method according to claim 30, comprising deriving the second timing signal from an external timing signal.

53. A method according to claim 30, comprising producing the second timing signal by dividing a frequency of the first timing signal by a factor.

54. A method according to claim 30, comprising operating the execution unit to execute a set generator instruction to store an identifier of a timing signal generator in a register associated with the at least one port, and supplying the second timing signal from the identified timing signal generator to the port.

55. A method according to claim 53, comprising operating the execution unit to execute a set factor instruction to allocate said factor.

56. A method according to claim 30, comprising setting the at least one port to a data mode in which it transfers data, and setting the at least one port to a clock output mode in which it outputs the second clock signal.

57. A method according to claim 30, wherein the interface circuitry comprises a plurality of ports and the internal circuitry comprises at least one register, the register being arranged to store data input from a first one of said ports; the method comprising operating the execution unit to execute a shift instruction to shift the data in the register by the width of the first port, and to subsequently execute one of said input instructions to input data from a second one of said ports into the register, thereby concatenating the data from the first and second ports.

58. A method according to claim 30, wherein the interface circuitry comprises a plurality of ports, the method comprising transferring data between each port and the external circuitry in dependence on a respective second timing signal, each respective second timing signal being derived from a different external source.

59. A mobile terminal having a mobile applications processor, at least one peripheral device, and an interface processor connected between the mobile applications processor and the peripheral device, the interface processor having interface circuitry and internal circuitry, the interface circuitry comprising at least one port and the internal circuitry comprising:
   an execution unit arranged to execute instructions in dependence on a first timing signal and to transfer data between the internal circuitry and the at least one port in dependence on the first timing signal; and
   a thread scheduler for scheduling a plurality of threads for execution by the execution unit, each thread comprising a sequence of instructions and the thread scheduler being arranged to schedule the threads in dependence on the first timing signal;
   wherein the at least one port is arranged to transfer data between the port and the mobile applications processor or peripheral device in dependence on a second timing signal, and to alter a ready signal in dependence on said second timing signal to indicate a transfer of data with the mobile applications processor or peripheral device; and
   the thread scheduler is configured such that said scheduling comprises: starting execution of one or more threads each including one of an input instruction and an output instruction which when executed performs a transfer of data between the at least one port and the internal circuitry, then suspending execution of said one or more threads, and then continuing execution of said one or more threads in dependence on the ready signal.

60. An array of interconnected processors, at least one of said processors having interface circuitry and internal circuitry, the interface circuitry comprising at least one port and the internal circuitry comprising:
   an execution unit arranged to execute instructions in dependence on a first timing signal and to transfer data between the internal circuitry and the at least one port in dependence on the first timing signal; and
   a thread scheduler for scheduling a plurality of threads for execution by the execution unit, each thread comprising a sequence of instructions and the thread scheduler being arranged to schedule the threads in dependence on the first timing signal;

wherein the at least one port is arranged to transfer data between the port and another processor in the array in dependence on a second timing signal, and to alter a ready signal in dependence on said second timing signal to indicate a transfer of data with said other processor of the array; and the thread scheduler is configured such that said scheduling comprises: starting execution of said one or more threads each including one of an input instruction and an output instruction which when executed performs a transfer of data between the at least one port and the internal circuitry, then suspending execution of said one or more threads, and then continuing execution of said one or more threads in dependence on the ready signal.

61. A processor having an interface means and internal circuitry, the interface means comprising port means and the internal circuitry comprising:

execution means for executing instructions in dependence on a first timing signal and for transferring data between the internal circuitry and the port means in dependence on the first timing signal; and thread scheduling means for scheduling a plurality of threads for execution by the execution means, each thread comprising a sequence of instructions and the scheduling by the thread scheduling means being in dependence on the first timing signal;

wherein the port means are for transferring data between the port means and circuitry external to the processor in dependence on a second timing signal, and for altering a ready signal in dependence on said second timing signal to indicate a transfer of data with the external circuitry; and the thread scheduling means is for scheduling by: starting execution of one or more threads each including one of an input instruction and an output instruction which when executed performs a transfer of data between the port means and the internal circuitry, then suspending execution of said one or more threads, and then continuing execution of said one or more threads in dependence on the ready signal.

62. A computer program product for scheduling threads in a processor having interface circuitry and internal circuitry, the interface circuitry comprising at least one port and the internal circuitry comprising an execution unit and a thread scheduler, comprising a storage media and a computer executable program wherein the program comprising code which when executed by a computer performs the steps of:

transferring data between the internal circuitry and the at least one port in dependence on the first timing signal;

operating the thread scheduler to schedule a plurality of threads for execution by the execution unit, each thread comprising a sequence of instructions and the scheduling being in dependence on the first timing signal;

transferring data between the at least one port and circuitry external to the processor in dependence on a second timing signal; and altering a ready signal in dependence on said second timing signal to indicate a transfer of data with the external circuitry;

wherein said scheduling comprises: starting execution of one or more threads each including one of an input instruction and an output instruction which when executed performs a transfer of data between the at least one port and the internal circuitry, then suspending execution of said one or more threads, and then continuing execution of said one or more threads in dependence on the ready signal.

* * * * *